Patented Feb. 28, 1928.

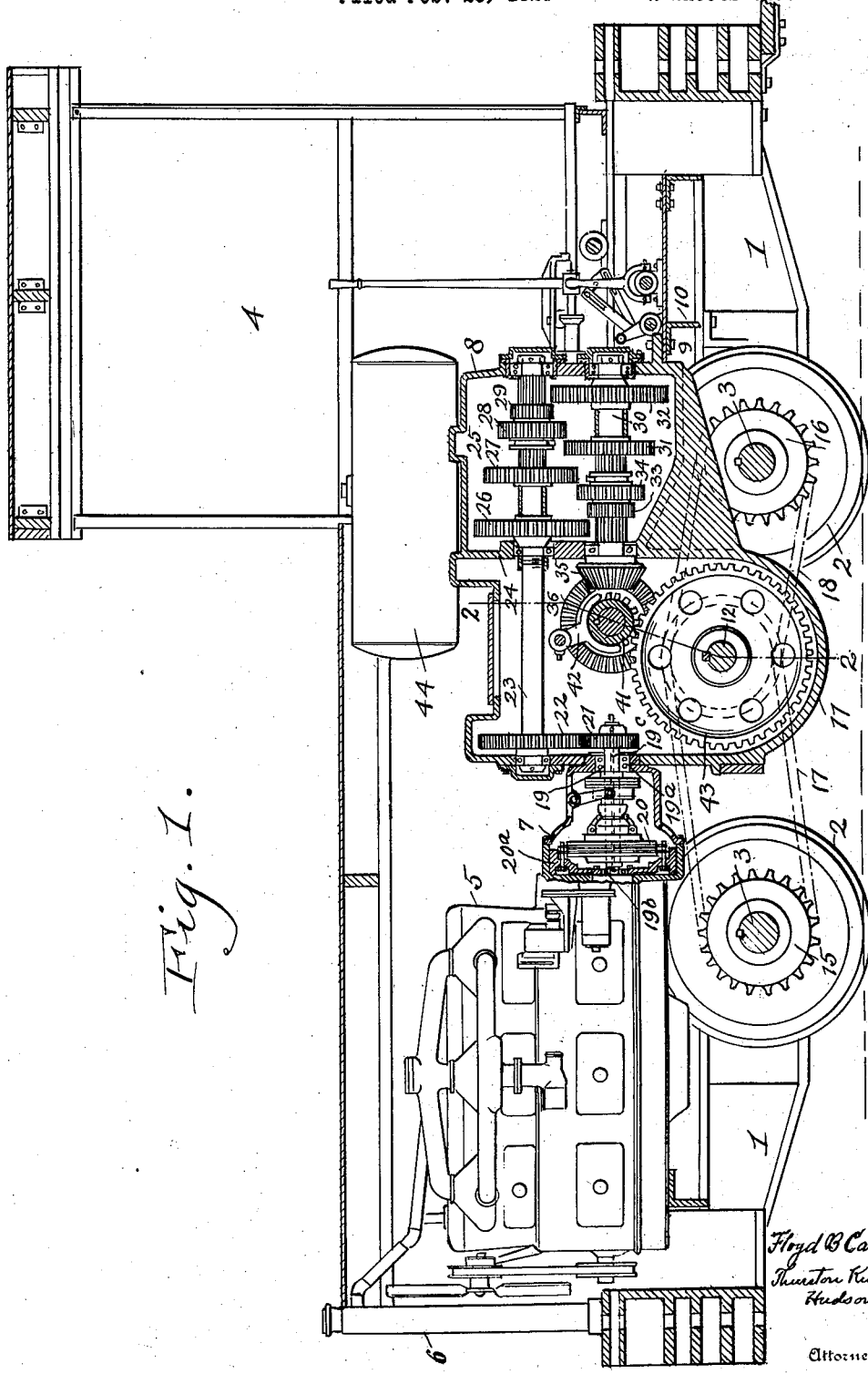

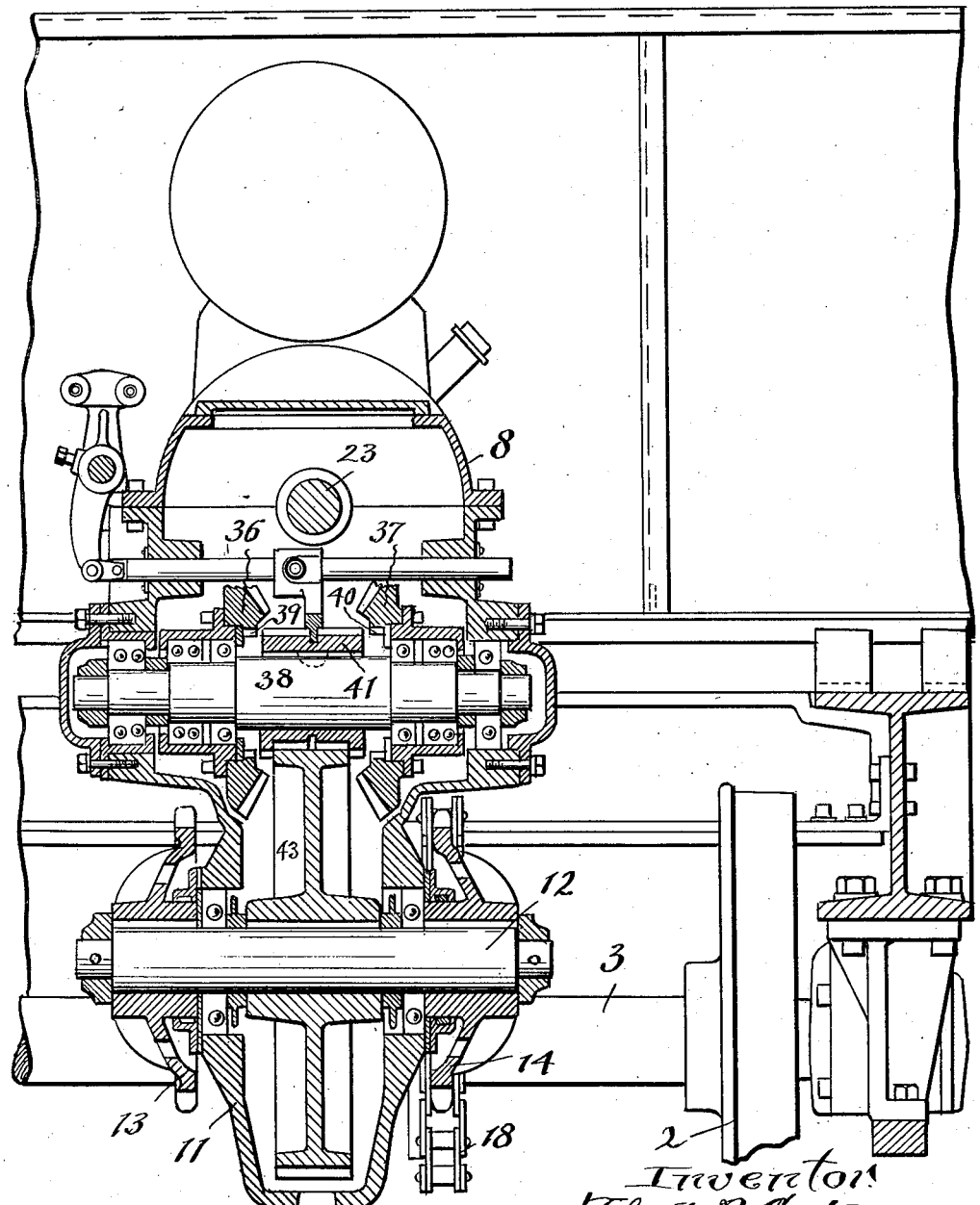

1,660,475

UNITED STATES PATENT OFFICE.

FLOYD B. CARTER, OF PLYMOUTH, OHIO, ASSIGNOR TO THE FATE ROOT HEATH COMPANY, OF PLYMOUTH, OHIO, A CORPORATION OF OHIO.

DRIVE FOR INDUSTRIAL LOCOMOTIVES.

Application filed February 25, 1925. Serial No. 11,449.

This invention relates to a driving mechanism for motor driven vehicles and particularly to motor driven vehicles of the industrial locomotive type.

The present invention has for an object to provide efficient mechanism for driving the traction wheels at various speeds in either direction from the engine through transmission gearing which occupies a minimum space and which is adapted to be housed within a single casing centrally of the vehicle frame.

A further object is to provide a transmission mechanism comprising shafts and gearing so disposed that the usual universal connection in the main draft shaft may be omitted.

A further object is to provide a transmission mechanism including change speed gearing driven through reduction gears so that the desired speed shifts may be obtained without employing excessively large gears in the change speed mechanism.

Other objects will be apparent from the following description taken in connection with the accompanying drawings.

Reference should be had to the accompanying drawings forming part of this specification in which Fig. 1 is a central longitudinal section through the transmission casing showing the transmission mechanism in side elevation; Fig. 2 is a transverse section taken on line 2—2 of Fig. 1.

Referring to the accompanying drawings, the frame of the locomotive is designated by the numeral 1 which is supported by the usual flanged traction wheels 2 which are flanged to run upon the rails of a railway track and are mounted upon transverse axles 3. The locomotive is provided adjacent the rear end with the operator's cab 4 and upon a front end of the frame 1 is mounted an engine 5 which serves to propel the locomotive, the engine and transmission mechanism being preferably enclosed within a suitable cover extending from the radiator 6 to the cab 4.

At the rear end of the engine casing there is secured a clutch casing 7 and to the clutch casing is secured a transmission casing 8 which extends from the rear end of the clutch casing 7 rearwardly over the rear axle 3, the casing 8 being secured at its rear end by means of a flange 9 integral with the casing which is bolted to a rear cross member 10 of the frame. Between the two axles 3 the casing 8 has a depending front end portion 11 in which is journaled a transverse shaft 12 from which the two axles are driven. Fixed to opposite ends of the shaft 12 outside the depending portion 11 of the transmission casing are sprockets 13 and 14 and on the front and rear axles 3 are fixed sprockets 15 and 16 which are aligned with the sprockets 13 and 14 on the shaft 12. Sprocket chains 17 run over the sprockets 13 and 15 and the sprocket chains 18 run over the sprockets 14 and 16.

Within the clutch casing 7 there is a short clutch shaft 19 which is supported in alignment with the engine crank shaft and also a suitable friction clutch 20 by which the shaft 19 may be connected to or disconnected from the fly wheel 20$^a$ which is fixed to the end of the engine crank shaft. The clutch shaft 19 is journaled adjacent its outer end in a suitable bearing 19$^a$ in the outer end of the clutch casing 7 and at its inner end in a pilot bearing 19$^b$ at the center of the fly wheel 20$^a$. The short clutch shaft 19 may be drilled to provide a passageway 19$^c$ extending axially from the outer end thereof and communicating at its inner end with the pilot bearing 19$^b$ through which lubricant may be supplied to the pilot bearing. The clutch shaft 19 projects rearwardly into the forward end of the transmission casing 8 and has fixed thereto within the casing 8 a small spur gear 21 which meshes with a larger spur gear 22 fixed to a shaft 23 which extends from the front to the rear end of the casing 8 parallel to the shaft 19 and is journaled in suitable bearings in the front and rear walls of the casing 8. The shaft 23 is also journaled in a suitable bearing in a transverse vertical partition 24 substantially midway between the ends of the casing 8, the partition 24 serving to provide a chamber 25 in the rear end of the casing 8 within which the change speed gearing is mounted. Spaced gears 26 and 27 of different sizes are fixed to the shaft 23 in the forward portion of the chamber 25 and in the rearward portion of the chamber 25 there are two gears 28 and 29 which are of different sizes and slidably keyed to the shaft 23, the gears 28 and 29 being formed integrally or rigidly secured together. Below the shaft 23 and parallel therewith there is a countershaft 30 which is journaled at its rear end in suitable bearings in the rear end wall of the casing 8 and adjacent its forward end in suitable bearings in the partition member 24. In the rear end of the chamber 25 the shaft 30 has two spaced gears 31 and 32 of different sizes fixed thereto and in the forward portion of the chamber 25 the shaft 30 has a pair of gears 33 and 34 of different sizes keyed thereto, the gears 33 and 34 being formed integrally or rigidly secured one to the other. The two pairs of gears 28 and 29 and 33 and 34 have suitable manually operated shifters connected thereto, the gears 28 and 29 being movable into mesh with the gears 31 and 32 and the gears 33 and 34 being movable into mesh with the gears 26 and 27 respectively. The gears 28 and 29 are movable from a position between the gears 31 and 32 and free from engagement with both said gears to a position in which the gear 28 meshes with the gear 31 or to a position in which the gear 29 meshes with the gear 32. The gears 33 and 34 are movable from a position between the gears 26 and 27 and free from engagement with both gears into a position in which the gear 33 meshes with the gear 26 or in the opposite direction into a position in which the gear 34 meshes with the gear 27 and the actuating connections for the pairs of gears 28 and 29 and 33 and 34 permit shifting of said pairs of gears in such a manner that a driving connection may be established between the shaft 23 and the countershaft 30 through any one of the four gears of the two shiftable pairs, thus providing four different speeds at which the countershaft 30 may be driven.

The forward end of the shaft 30 projects through the partition 24 and has fixed thereto in front of the partition a beveled gear 35 which meshes with oppositely facing bevel gears 36 and 37 which are loose on a transverse shaft 38 journaled in the side walls of the casing 8. The beveled gears 36 and 37 are provided upon their inner sides with recesses formed with internal gear teeth 39 and 40 in which the teeth of a wide pinion 41 which is slidably keyed to the shaft 38 are adapted to fit, the internal teeth of the beveled gears coacting with the teeth of the pinion to clutch either of said beveled gears to the pinion 41. The wide pinion 41 has a central circumferential groove which is engaged by a shifter 42 which may be moved to shift the gear 41 into locking engagement with either of the beveled gears 36 or 37. The beveled gears 36 and 37 are continuously driven in opposite directions by the beveled gear 35 and the pinion 41 is adapted to be driven in one direction when in locking engagement with one of the beveled gears and in the opposite direction when in locking engagement with the other of the beveled gears. The pinion 41 meshes continuously in all its positions of adjustment with a large gear 43 fixed to the shaft 12 from which direct driving connections are taken to the axles 3. The reversing mechanism above described being interposed between the change speed gearing and the traction wheels, it follows that the traction wheels may be driven either forwardly or rearwardly at any of the speeds provided by the change speed gearing. In addition, the pinion 41 driving the large gear 43 provides a speed reduction between the change speed gearing and the traction wheels. The gears 21 and 22 provide a speed reduction between the engine shaft and the change speed gearing and, by reason of the reduction gears between the change speed gearing and the engine and between the change speed gearing and traction gears, the different driving speeds desired may be obtained through comparatively small gears in the change speed gearing.

It should be noted that the entire driving mechanism is directly aligned with the engine crank shaft and housed within a single casing at the center of the vehicle frame. The connection with the clutch shaft 19 through the gears 21 and 22 provides sufficient flexibility in the driving connections so that it is unnecessary to provide the usual universal connection in the transmission drive shaft. The transmission housing is located directly above the axle 3 centrally of the frame 1 and may serve as the support for the fuel tank 44 which is provided with suitable connections for delivering fuel to the engine.

Having described my invention, I claim:

1. In a power driven vehicle, front and rear pairs of traction wheels, a shaft parallel with the axis of said wheels and located between the front and rear wheels, driving connections between said shaft and axles, a large gear fixed to said shaft, a shaft parallel with the first mentioned shaft, a pair of inwardly facing bevel gears fixed to said shaft, a gear slidably keyed to said shaft between the bevel gears and meshing with said large gear, said bevel gears each having internal teeth engageable with the slidable gear, a shaft at right angles to said second shaft, a bevel gear fixed to said shaft and meshing with the bevel gears first mentioned and means for driving said last mentioned shaft at various speeds.

2. In a power driven vehicle, a frame, front and rear axles carrying traction wheels, a shaft journaled in the frame between the front and rear axles and parallel with the same, driving connections between said shaft and traction wheels, an engine on the frame at one side of said shaft, a shaft above the first mentioned shaft and at right angles thereto, driving connections including a reduction gearing between the engine and last mentioned shaft, a countershaft parallel with the last mentioned shaft, change speed gearing interposed between said parallel shafts, gearing for driving the first mentioned shaft in either direction from said countershaft, said change speed and reduction gearings being positioned at opposite sides of said first mentioned shaft, and a single casing enclosing all of the driving connections from the engine to the first mentioned shaft.

3. In a power driven vehicle, a frame having front and rear axles carrying traction wheels, a shaft parallel with and between the axles, driving connections between said shaft and the traction wheels, an engine at one side of the said shaft, a shaft extending across said first mentioned shaft above the same and at right angles thereto, reduction gearing positioned between the first mentioned shaft and the engine and connecting one end of said second shaft to the engine, a countershaft parallel with and below the opposite end of said second shaft, change speed gearing interposed between said second shaft, and counter-shaft and positioned beyond said first mentioned shaft, and reversing gearing interposed between the countershaft and first mentioned shaft, and a single casing enclosing all of the driving connections from the engine to the first mentioned shaft.

4. In a power driven vehicle, a frame having front and rear axles carrying traction wheels, a shaft parallel with said axles and between the same, driving connections between said shaft and traction wheels, a large gear fixed to said shaft centrally thereof, an engine on the frame forwardly of the said shaft, a gear casing extending rearwardly from said engine past said shaft and having an intermediate portion enclosing the large gear of said shaft, a shaft in the upper portion of the casing extending longitudinally thereof and at right angles to said first mentioned shaft, reduction gearing within the forward end of the casing connecting said second shaft to the engine, a countershaft in the casing rearwardly of the first mentioned shaft and parallel with the second shaft, change speed gearing in the casing through which the countershaft is driven from the second shaft, and reversing gearing in the casing interposed between the countershaft and said large gear.

In testimony whereof, I hereunto affix my signature.

FLOYD B. CARTER.